(12) United States Patent
Asakura et al.

(10) Patent No.: US 6,744,349 B1
(45) Date of Patent: Jun. 1, 2004

(54) REMOTE CONTROL SYSTEM FOR A VEHICLE DOOR

(75) Inventors: Suguru Asakura, Saitama (JP);
Kentaro Yoshimura, Saitama (JP);
Yoshikazu Imura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 416 days.

(21) Appl. No.: 09/669,722

(22) Filed: Sep. 26, 2000

(30) Foreign Application Priority Data

Oct. 4, 1999 (JP) .............................. 11-282624

(51) Int. Cl.⁷ .................... G05B 19/00; G06F 7/00; G06K 19/00
(52) U.S. Cl. .............. 340/5.62; 340/5.72; 340/5.61; 340/5.63; 340/5.64; 340/5.6
(58) Field of Search .............. 340/5.62, 5.61, 340/5.72, 5.63, 5.21, 5.27, 541, 542, 825.72, 825.69, 5.64, 5.6; 361/170

(56) References Cited

U.S. PATENT DOCUMENTS 4,942,393 A * 7/1990 Waraksa et al. ....... 340/825.72
5,552,641 A * 9/1996 Fischer et al. ............. 307/10.5
5,838,257 A * 11/1998 Lambropoulos ....... 340/825.54
5,973,611 A * 10/1999 Kulha et al. ........... 340/825.31

FOREIGN PATENT DOCUMENTS

| EP | 0 937 844 A1 | 8/1999 |
|----|----|----|
| JP | 5-106376 | 4/1993 |
| JP | 10-25939 | 1/1998 |
| JP | 10-153025 | 6/1998 |
| JP | 11-107592 | 4/1999 |
| JP | 11-141211 | 5/1999 |

* cited by examiner

Primary Examiner—Michael Horabik
Assistant Examiner—Vernal Brown
(74) Attorney, Agent, or Firm—Westerman, Hattori, Daniels & Adrian, LLP

(57) ABSTRACT

A remote door controlling apparatus with a welcome function automatically locking and unlocking the door(s) of a vehicle depending on the distance between the vehicle and a portable transmitter/receiver. The portable transmitter/receiver has a manual control signal transmitting function for selectively locking and unlocking the door(s) of the vehicle and the manual control is carried out with a priority over the automatic control according to the welcome function within a predetermined period of time.

3 Claims, 12 Drawing Sheets

REMOTE CONTROL SYSTEM FOR A VEHICLE DOOR

BACKGROUND OF THE INVENTION

1. Field of the Invention

The present invention relates to a remote control system for a vehicle which can automatically lock and unlock the door(s) of a vehicle in wireless communication and more particularly to a remote control system for a vehicle which can automatically lock the door(s) of a vehicle when a user (driver) who carries with him an electronic or entry key (with a portable transmitter/receiver) which includes an identification code assigned to the vehicle, walks away a first predetermined distance from the vehicle and automatically unlock the same when the user comes back to a second predetermined distance.

More particularly, the present invention relates to an improvement of the above mentioned remote door lock controlling apparatus in which when a manual control signal released through manual operation on a portable transmitter/receiver is received by the vehicle, a door lock control action corresponding to the manual control signal is carried out with priority.

2. Description of the Related Art

Lock/unlock remote-control systems for vehicle doors are known having a so-called, "welcome function". In the systems, every user (driver) of a vehicle owns an entry key (with a portable transmitter/receiver) which upon receiving a response demand signal that is transmitted from a transmitter installed in the vehicle and is receivable within a predetermined range about the vehicle (which may be referred to as "having a predetermined communication area" hereinafter), can transmit a response signal carrying a unique identification code assigned in advance to each vehicle. When the user walks away from the predetermined first range of the vehicle and its entry key is disabled to receive the response demand signal and thus to transmit back the response signal, the door of the vehicle is automatically locked. When the entry key moves into the predetermined second range and its response demand signal is received by the transmitter/receiver which then responses thereto to send back a response signal, the door is automatically unlocked.

For example, some of such conventional "welcome function" based lock/unlock remote-control systems for vehicle doors are disclosed in Japanese Patent Laid-open Publications (Heisei)5-106376 and (Heisei)10-25939 in which a transmitter mounted on a vehicle is provided for intermittently transmitting a response demand signal having a predetermined communication area and, when receiving a signal responding to the response demand signal from an entry key which is carried by the user of a vehicle and moves into the predetermined communication area, examining whether the response signal is valid (regular) or not (welcome code examination). When the response signal has been examined to be valid, the door(s) of the vehicle is automatically unlocked. On the contrary, when the response signal is not valid or when the entry key stays out of the predetermined communication area and the vehicle-mounted transmitter receives no response signal, the door remains locked.

Accordingly, when the user of the vehicle carrying the entry key simply walks away from the predetermined first range of the vehicle, the door of the vehicle can automatically be locked without paying any attention to or operating the entry key. When the user comes into the predetermined second range, the door can automatically be unlocked. This requires no boresome actions of unlocking the door for riding the vehicle as well as contributes to the prevention of failing to lock door(s), and of vehicle theft.

The conventional systems have some advantages, particularly once the communication area is preset to a smaller size (for example, less than one meter in radius), the systematic locking of the door can easily be confirmed after getting off the vehicle, the power consumption for transmitting signals can be as small as not hostile to a battery, and the ID code (uniquely assigned to a vehicle) can hardly be intercepted by any other parties. The locking of the door may be easily confirmed by auditorily and visually perceiving the sound of a door locking mechanism and the shift of an inside door lock knob to the lock position.

Another conventional system disclosed in Japanese Patent Laid-open Publication (Heisei)10-153025 is provided in which a transmission antenna for detecting the approaching of an object into a middle-sized area around a vehicle is mounted on the vehicle in addition to an antenna for transmitting the response demand signal. Upon detecting the approaching of the object or a driver into the middle-sized area, the vehicle releases the response demand signal with a small-sized predetermined communication area and, when receiving a response signal to the response demand signal from the entry key of the right driver, unlock the door. Also, a second transmitting means having a greater communication area is provided for locking the door. The door is thus locked when the communication to the entry key with the second transmitting means is disabled.

With such a conventional apparatus, once the user of the entry key (for example, the driver and may be referred to as an "entry key" hereinafter) has disembarked from the vehicle whose doors were thus locked automatically and has stepped out from the predetermined first communication area, a passenger of the vehicle who intends to return back to the vehicle for e.g. fetching its own article has to be accompanied with the user of the entry key in the communication area for unlocking the doors.

Also, while the doors of the vehicle are not locked with the user of the entry key disembarked from the vehicle and working about the vehicle, for example, ordering in the trunk room, or the doors are automatically unlocked with the entry key coming close to the vehicle but not arriving at the vehicle, a passenger is not permitted to urgently lock the doors even if any emergency case happens such as a third person sneakingly approaching the vehicle or articles in the vehicle being stolen from the other side of the vehicle where the door is open.

An apparatus disclosed in Japanese Patent Laid-open Publication (Heisei)10-25939 only illustrates an electronic (entry) key equipped with relevant manual switch. However, it fails to describe the relation between the door locking and unlocking with the manual switches on the electronic key and the automatic door locking and unlocking of a primarily basic function, i.e. whether the door locking and unlocking can be carried out by operating the manual switches on the electronic key when the apparatus is in the automatic locking and unlocking mode. Even if the door locking and unlocking is capable to be carried out under such condition, its practical procedure is not clarified at all.

SUMMARY OF THE INVENTION

It is an object of the present invention to provide a remote door lock controlling apparatus for a vehicle which is capable of locking/unlocking the door(s) of the vehicle from a remote position upon request of the user of an entry key through giving the priority to the door lock control action corresponding to the operation of a manual switch on the entry key even when its door control function is in the automatic locking/unlocking mode enabled upon receiving a response signal from the entry key.

In the first aspect of the present invention, a remote door lock controlling apparatus for a vehicle comprises: a transmitter mounted on the vehicle for transmitting a response demand signal receivable in a predetermined range outside of the vehicle; a vehicle mounted receiver for receiving a response signal transmitted from a portable transmitter/receiver in response to the response demand signal; and a door lock controlling means for controlling at least either locking or unlocking of the door(s) of the vehicle in response to the reception of the response signal at the vehicle mounted receiver, wherein when the vehicle mounted receiver receives a manual control signal which is different from the response signal and transmitted through manual operation of a switch mounted on the portable transmitter/receiver, the door lock controlling means carries out the door lock control action corresponding to the manual control signal with priority over the door lock control action corresponding to the response signal. In addition, a timer is provided for stopping the prior action of the door lock control corresponding to the manual control signal when its setting period has been elapsed.

Accordingly, when a passenger wants to return back to the vehicle to fetch its article after the door is automatically locked with the portable transmitter/receiver (an entry key) stepped out from the predetermined range, its switching action on the entry key for transmitting the manual control signal can unlock the door with priority over the door lock control action corresponding to the response signal. The conventional disadvantages that the passenger has to be accompanied with the user of the entry key for returning back into the communication range will successfully be eliminated.

Also, even if the doors of the vehicle are not locked with the user of the entry key disembarked from the vehicle and staying within the communication range, or the doors are automatically unlocked with the entry key coming close to the vehicle but not arriving at the vehicle, the doors can instantly be locked by the user to prevent any third person from opening the door of the vehicle and avoid any criminal event such as vehicle theft.

For example, as described previously, when a passenger wants to return back to the vehicle to fetch its article after the door is automatically locked, and the door is unlocked, the timer allows the door to be automatically locked after its setting time by the original door lock control action of the welcome function depending on the distance between the entry key and the vehicle without a manual operation to lock the door again using the switch on the entry key. Hence, any failure of locking door(s) can be compensated.

In case that the door is shifted from the unlocked state to the locked state by an accidental or unintentional switching on of the switch on the entry key with the user walking towards the vehicle, it can automatically be unlocked by the door lock control action of the welcome function when the setting period of the timer is elapsed. Accordingly, no manual action is needed for unlocking the door and the utility can be improved.

In the second aspect of the present invention, the remote door lock controlling apparatus may be modified in that the prior door lock control action corresponding to the manual control signal is stopped when another manual control signal is received by the vehicle mounted receiver during the prior door lock control action.

This allows the prior door lock control action, which has been selected for locking or unlocking the door with priority by the corresponding manual switch on the entry key being selected, to be stopped by only manually operating any one of the switches on the entry key. It is not necessary for the user to remember the priority door lock control action and carry out its reverse action. Thereafter, the door lock control action of the welcome function depending on the distance between the entry key and the vehicle is systematically performed to develop automatically the optimum locked or unlocked state of the doors. Hence, while the theft protection is ensured, the utility can be improved.

In the third aspect of the present invention, the remote door lock controlling apparatus is modified in that the transmission of the manual control signal from the portable transmitter/receiver has priority over the transmission of the response signal.

This allows the manual control signal to be transmitted with priority upon its corresponding switch on the entry key being turned on. Accordingly, the door lock control action desired and initiated by the user can be executed as soon as possible. For example, when the user walks into the communication range to cause the door to be unlocked with the entry key receiving the response demand signal and transmitting the response signal to hold the door(s) in unlocked state, the door(s) can be instantly locked again by manual operation of the switch on the entry key upon finding a third undesired person staying close to the vehicle for activating the theft protection function.

DETAILED DESCRIPTION OF THE PREFERRED EMBODIMENTS

Figure 1:
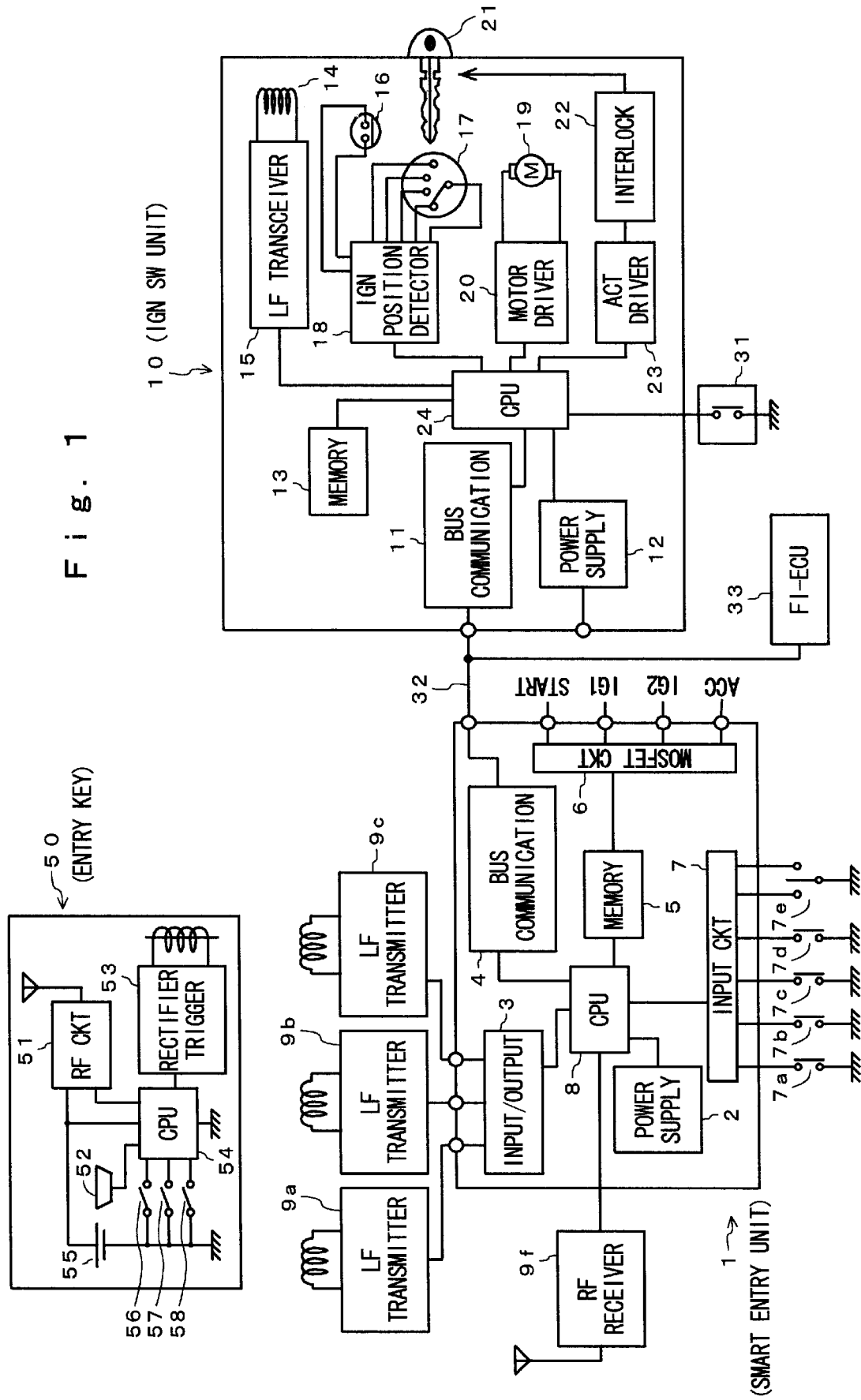
FIG. 1 is a block diagram showing a structure of the first embodiment of the present invention.

A remote control system for a vehicle door to which the present invention is suitably applied will be describe in more detail referring to the accompanying drawings. Before starting the main description, some definitions on the flags at 1 of the bit and the timers employed in the description and the drawings are explained as listed below.

AREC=reception of A code;
ATM=transmission of A response demand signal;
BCHG=start of examining the shift from BS (small B) response demand signal to (BL) large B response demand signal;
BLTM=transmission of BL response demand signal;
BREC=reception of B code;
BSTM=transmission of BS response demand signal;
BTM=transmission of B response demand signal;
I (variable)=the number of consecutive receptions of A code;
IMCHK=start of immobilizing checkup;
IMDONE=finish of immobilizing checkup;
IMOK=result of immobilizing checkup is OK?;
m(variable)=set value in timer T-OUT;
MOD(n, m)=remainder of n/m;
MU=process responding to manual code is being carried out with priority;
n(variable)=setting for the kind of response demand signals to be transmitted;
OUT=the entry key is out of communication area for A response demand signal;
RCHK=timer T-OUT has started for examining the entry key is not near about vehicle;
RF1/2=finish of refresh procedure 1, 2, respectively;
T-BCHG=timer for setting exchange of B response demand signals;
T-IMCHK=timer setting time for immobilizing checkup;
T-MU=timer setting time for executing process responding to manual code with priority;
T-OUT=timer setting time for judging that the entry key is out of communication area for A response demand signal;
Timer Interrupt Permission Bit for Response Demand Signal timer interruption permission for transmission of response demand signal.
Manual Operation Inhibiting Bit=Manual Operation Inhibited A welcome system to which the present invention is applied will be described referring to the block diagram of FIG. 1.

A smart entry unit 1 comprises a power supply circuit 2 such as a battery equipped on the vehicle, an input/output circuit 3 connected to LF (low frequency) transmitter circuits 9a to 9c, a bus communication circuit 4 connected by a communication line 32 to an ignition SW unit 10 which will be described later, a memory circuit 5, an MOSFET circuit 6, an input circuit 7, and a CPU 8 connected to above-mentioned circuit components for controlling their actions. The CPU 8 is further connected to an RF receiver circuit 9f.

The input circuit 7 is connected to a manual SW 7a for setting the system to a manual mode in which the system is responsive to only a manual code derived by manual operation from an entry key 50 which is described later, as well as a door lock SW 7b for detection the locking/unlocking of the door in addition to four door SWs 7c, a trunk SW 7d, a door key cylinder SW 7e, and so on. The door switch SW and the trunk SW detect open/closed condition of each corresponding doors, respectively. The door key cylinder SW detects to which side the door key cylinder is operated lock or unlock.

The entry key 50 which is usually carried and manipulated by a driver or user of the vehicle comprises an RF circuit 51 for transmitting an RF signal from an antenna, an alarm/display 52 such as a buzzer, a rectifier/trigger (TRIG) circuit 53 for processing LF (low frequency) signals received which are transmitted from the LF transmitter circuits 9a to 9c, a CPU 54, and a battery 55. The entry key is further equipped with manual lock/unlock switches 56 and 57 for transmitting manual codes for manually locking and unlocking the door, and a switch 58 for setting the system in the manual mode. The switches 56 and 57 may be modified into a single switch for repeating alternately the lock and unlock actions.

The ignition SW unit 10 comprises a bus communication circuit 11 for exchanging signals via the communication line 32 with the smart entry unit 1, a power supply circuit 12, a memroy circuit 13, an immobilizing (anti-thief functioning) antenna 14, a low frequency (LF) transmitter/receiver circuit 15, a key SW 16 for detecting the insertion/extraction of a key, an ignition (IGN) SW 17, an IGN position detector 18 for detecting the contact position of the IGN SW 17, a motor 19 for moving a rotary contact of the IGN SW 17, a motor driver 20 for driving the motor 19, an auxiliary (or emergency) key 21 which is inserted and extracted to and from the key cylinder, an interlock ACT (actuator) 22 for prohibiting the removal (or extraction) of the auxiliary key 21, an ACT driver 23 for driving the interlock ACT 22, and a CPU 24 for controlling the actions of the above-mentioned components. The CPU 24 is also connected to a quick start SW 31 for starting the engine.

Figure 2:
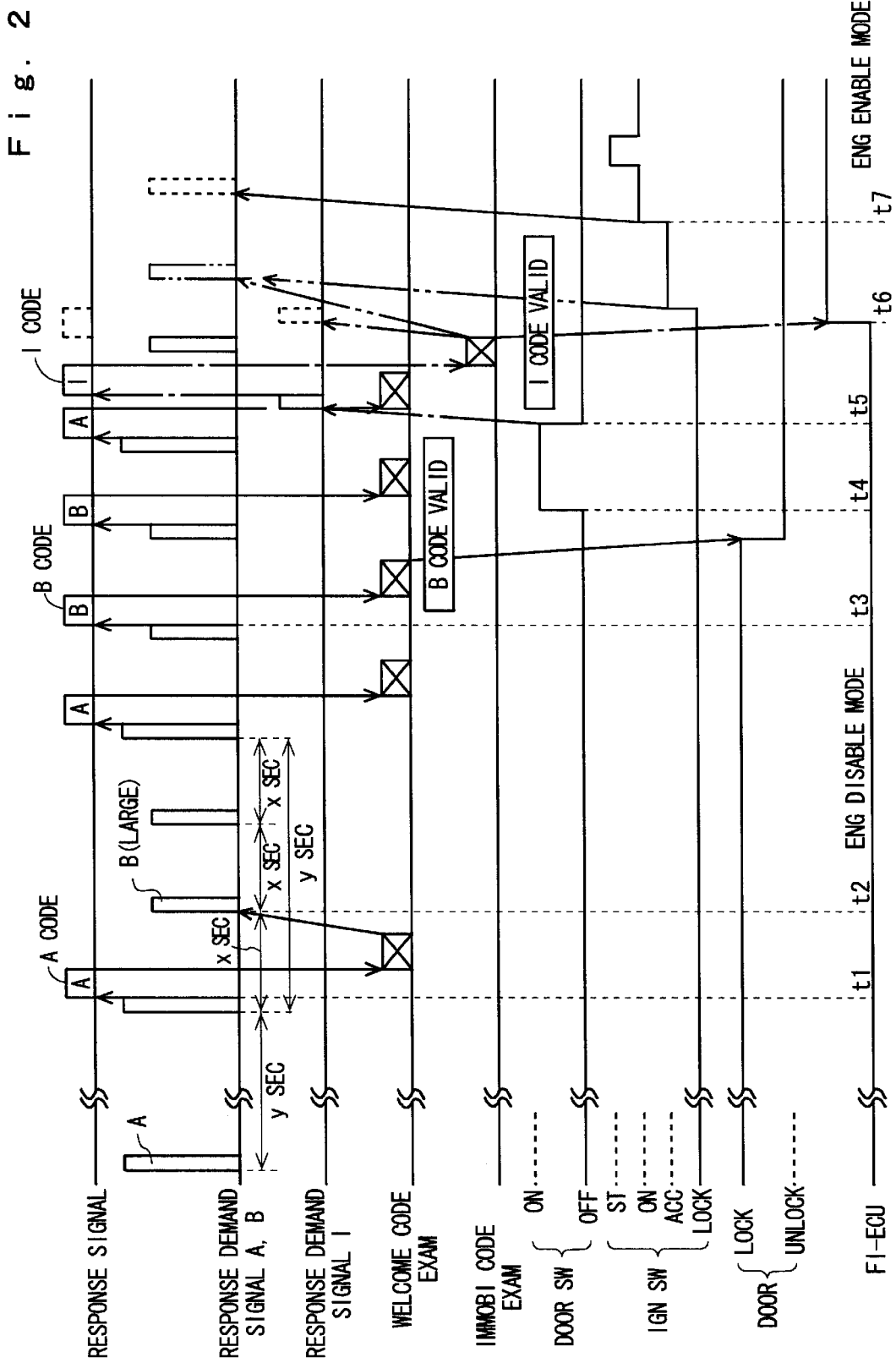
FIG. 2 is a timing chart illustrating the automatic unlocking action of a door in the first embodiment of the present invention when the driver carrying the entry key moves to the vehicle and embarks.
Figure 3:
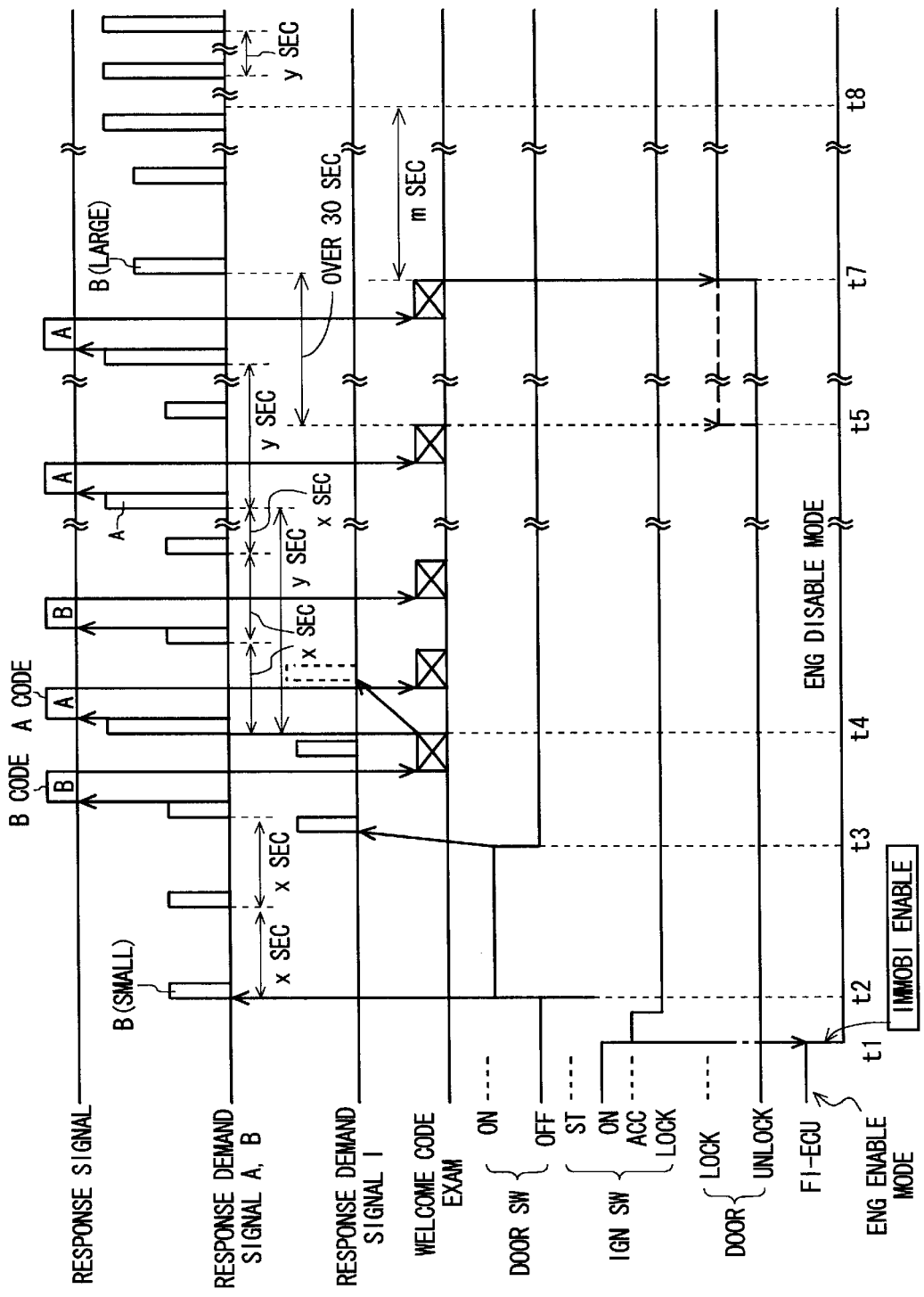
FIG. 3 is a timing chart illustrating the automatic locking action of the door in the first embodiment of the present invention when the driver disembarks and the entry key departs from the vehicle.
Figure 13:
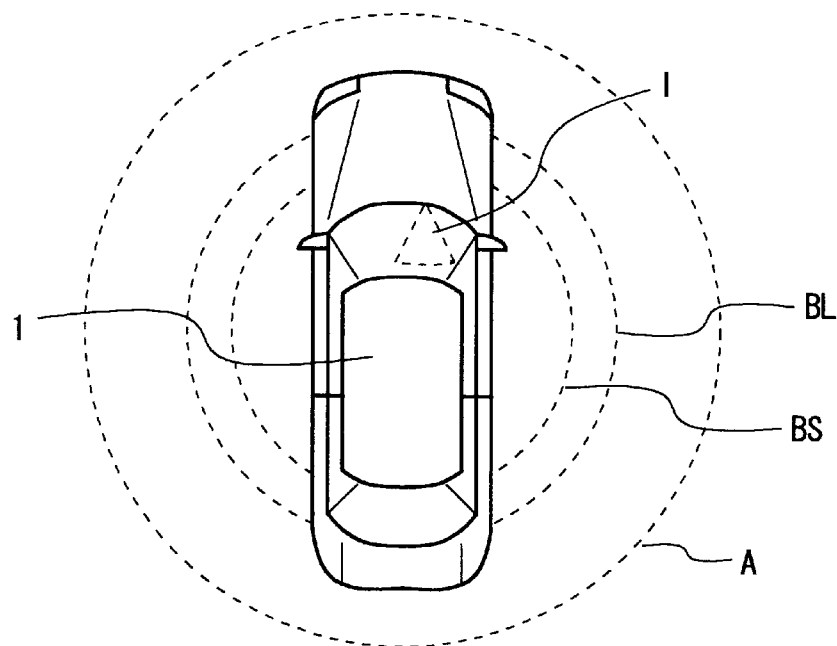
FIG. 13 is a schematic view showing the relation between the control operations and the distance from the vehicle to the entry key in the first embodiment of the present invention.

The operation of the smart entry unit 1 and the entry key 50 will schematically be described referring to the timing charts of FIGS. 2 and 3 and the schematic view of FIG. 13. FIGS. 2 and 3 illustrate the welcome function in which the door of the vehicle is unlocked and locked in response to the detection of the user, carrying the entry key 50 (who may hence be simply referred to "entry key" hereinafter), coming close to the vehicle 1 for boarding and leaving from the vehicle 1 after getting off, respectively. In these figures, the height of the bars of the response demand signals represents the intensity of the signals thus indicating the size of the communication area (receivable range).

When the entry key is outside of and distanced significantly from the vehicle of which the door remains locked in a disembark or parking mode, an A response demand signal (of e.g. 100 kHz) shown at the left side end in FIG. 2 is transmitted from the vehicle at equal intervals of a first predetermined time (y seconds) and with an intensity corresponding to the maximum communication area (for example, 4 to 5 meters in radius) denoted by A in FIG. 13. As the driver carrying the entry key moves into the communication area A for the A response demand signal, the entry key receives the A response demand signal at the moment t1 and transmits a send-back signal or a response signal responding to the A response demand signal which includes an A code and may be referred to as "A code" hereinafter. The format of the response signal will be explained later in more detail referring to FIG. 15.

The vehicle, when receiving the response signal and judging that the response signal received is valid, releases a large B response demand signal (e.g. of 300 kHz and having a one-meter-radius communication area denoted by BL in FIG. 13) from t2 at equal intervals of a second predetermined time (x seconds). It is assumed y>x or more specifically, y=3x in this embodiment. Upon receiving the BL response demand signal at t3, the entry key 50 releases a response signal which includes a B code and may be referred to as a "B code" hereinafter. When it is judged that the response signal including the B code is valid, the door of the vehicle is unlocked.

As the door is opened at t4 (door SW is turned on) and then closed at t5, it is determined that the driver has embarked and an I (immobilizing) response demand signal designated its communication area as in the interior of the vehicle is transmitted. When the entry key then releases a response signal to the I response demand signal, which include an I code (immobilizing code), the vehicle carries out immobilizing checkup (immobilizing code examination) for deciding whether the I code received is valid or not. When the I code is valid, the transmission of the I response demand signal is stopped and an FI-ECU 33 is switched at t6 into the engine enabling mode.

Then, upon the ignition SW (IGN SW) being turned to the ON position at t7, the transmission of both the A and B response demand signals is stopped and simultaneously a refresh 2 process is commenced as will be described later. The transmission of the A and B response demand signals may be stopped, instead, upon judging that the I code is valid, or in response to the on/off reversal of the door switch triggered by the opening and then closing of the door (cf. differently dashed lines in FIG. 2).

The movement of the vehicle 1 is stopped and then as the IGN SW is turned from the ON position to the ACC position at t1 as shown in the left end of FIG. 3, the FI-ECU 33 is switched to the engine disabling mode by the immobilizing function. When the door SW is shifted from the OFF position (door closed) to the ON position (door opening) at t2 in the door unlock mode, it is judged that the driver is about to disembark and the transmission of a BS response demand signal (e.g. of 300 kHz having substantially a 0.5-meter-radius communication area denoted by BS in FIG. 13) is then commenced. This is followed by intermittently transmitting the BS response demand signal at equal intervals of the second predetermined time (x seconds) from the vehicle. Then, as the door SW is shifted from the ON position to the OFF position (door closed) at t3, the I response demand signal is transmitted at the predetermined intervals.

The BS response demand signal and the BL response demand signal are both to demand the entry key transmit a response signal containing the B code. The two response demand signals are different only in the communication area (a range for transmitting and receiving signals) and identical to each other in the other properties.

When the entry key is disembarked, it enables to receive not the I response demand signal but the BS response demand signal. Then a response signal to the BS response demand signal including the B code is released. When the response signal including the B code is receive at the vehicle and is judged to be valid at t4, the A response demand signal is commenced to be transmitted while the transmission of the I response demand signal is stopped. The entry key continues to release the response signal including the A and B codes while receiving both the A and BS response demand signals.

As the driver with the entry key moves away from the vehicle and steps out from the BS communication area shown in FIG. 13, it is disabled to receive the BS response demand signal and no response signal with B code shall be sent back. When the B code is not received by the vehicle after a predetermined period (for example, 30 seconds as shown in FIG. 3) from the reception of the A code (at t5 in FIG. 3), the B response demand signal is switched from the BS signal to the BL signal. As the B code is no more received after the predetermined period while only the A code is received and its welcome code examination is executed (i.e. in this embodiment, only the A code is continuously received but the B code has not been received in y seconds), the door is then locked at t7 when the final A code is examined to be valid.

After t8 when the setting (m seconds) of the T-OUT timer has elapsed since the entry key is far enough away from the vehicle not to receive the A response demand signal and thus not to send back the A code, the intermittent transmission of only the A response demand signal at the intervals of y seconds is maintained. Alternatively, as denoted by the dotted line in FIG. 3, the door may be locked at t5 when the A code is received just after the (predetermined number of) receptions of the B code at the estimated (expected) moment are not executed.

The operation of the smart entry unit 1 will now be described schematically referring to the flowcharts of FIGS. 4 and 5.

Upon energized, the system is initialized in its entirety (Step S1). At Step S2, it is examined whether the ignition switch (referred to an IGN SW hereinafter) is turned on or not. When the IGN SW is turned off by the driver to stop the vehicle at t1 in FIG. 3, the procedure goes to Step S3 where the refresh 1 process, i.e. the initialization of flags for the (anti-thief) immobilizing system, is carried out. This process at Step S3 will be explained later in more detail referring to FIG. 7.

This is followed by Step S5 where it is examined whether the door is unlocked or not. At Step S6, it is examined whether or not the door SW is turned from the ON position to the OFF position (i.e. whether the opened door of the vehicle is closed or not). As it is judged "NO" at Step S6 while the door is opened for disembarkation, the procedure jumps to Step S9 where it is examined whether or not the manual SW 7a is turned on for shifting the system to the manual mode where the door can be unlocked/locked using the manual switch on the entry key. In normal, the manual SW 7a remains turned off (i.e. the manual mode is not selected) and it is judged "NO". It is then examined at Step S10 whether or not the door SW is turned from the OFF position to the ON position (i.e. the closed door is opened).

As the door is opened for disembarkation, the door switch is turned from the OFF position to the ON position and it is judged "YES" at Step S10. Then, Step S11 follows where it is examined whether the BREC flag is 1 or not (i.e. the B code is received or not). In the beginning, the B code is not received and the procedure advances to Step S12 where the BSTM flag is set to 1 and the variable n for determining the type of the response demand signal (A, BS, or BL) is reset to 0.

Step S12 is a process of selecting the type of the response demand signal to be transmitted and, as will be explained later, the B small type having a smaller communication area is set. At Step S13, the timer interruption permitting bit for enabling the transmission of the response demand signal is set, i.e. the transmission of the response demand signal by timer interruption is enabled.

Then at Step S14, the code signal contained in the response signal transmitted from the entry key 50 and received by the vehicle is compared with ID codes previously stored in the memory circuit 5 in the vehicle.

In the beginning, it is judged "NO" at Step S14 and the procedure moves to Step S15A where it is examined based on the IMCHK flag whether the immobilizing checkup is finished or not. At the time, the immobilizing checkup is not performed and the procedure jumps to Step S30 (in FIG. 5). Similarly, it is judged "NO" at Step S30 and the procedure goes to Block S41.

At Block S41, the flags for the welcome function are initialized when the code is not received during a predetermined period of time. In fact, it is examined referring to the OUT flag at Step S31 whether or not the entry key is out of the communication area for the A response demand signal. In the beginning, it is not registered (i.e. OUT flag=0) that the entry key is out of the communication area for the A response demand signal. It is then examined at Step S32 whether the RCHK flag is 1 or not (i.e. the T-OUT timer for setting time duration to determine that the entry key is not adjacent to the vehicle, has been started or not). When it is judged "NO", the procedure goes to Step S33 where the T-OUT timer is set to m seconds to be started.

It is preferable that m satisfies m sec>y(=3x) sec≧z sec where y is the interval of transmission (or cycle) of the A response demand signal, x is the interval of transmission of the B response demand signal, and z is the interval of transmission of the I (immobilizing) response demand signal, as shown in FIG. 2. Then, at Step S34, the RCHK flag is set to 1 for starting the T-OUT timer.

This is followed by Step S35 where it is examined whether the T-OUT timer is turned to zero as the setting time of m seconds has been elapsed. In the beginning, the setting time of m seconds is not elapsed and thus the procedure returns back to Step S2.

As the driver disembarks and the door is closed, the door switch is shifted from the ON position to the OFF position allowing Step S6 to judge "YES". The procedure thus goes to Step S7 where the refresh 1 flag is reset to 0. Step S8 follows where the timer interruption permitting bit for permitting the transmission of the I response demand signal is initiated to enable the transmission of the I response demand signal with timer interruption. Then, the procedure moves to Steps S14, S15A, and S30, and Block S41 and returns back to Step S2.

As the entry key 50 is moved out of the vehicle, it receives the BS response demand signal and sends back the B code. The B code from the entry key 50 is received by the receiver on the vehicle and qualified as a valid code and it is then judged "YES" at Step S14. The procedure thus goes to Step S15 where it is examined whether or not the signal code received is the manual code sent from the entry key 50 by the manual switch operation for locking and unlocking the door. When it is judged "YES", the procedure advances to Step S16 where the manual operation is enabled (which is a process to interpret the code issued through the manual switch operation and will be explained in no more detail).

As the received code is the B code carried on a response signal to the response demand signal at present, it is judged "NO" at Step S15 and the procedure moves to Step S17 where it is examined whether the manual SW is turned on or not. When it is judged "YES" at Step S17, the procedure returns back to Step S2. As "NO" is now given at Step S17, however, the procedure goes to Step S18 where the welcome function process for unlocking/locking the door in response to the result of the judgment of the code included in the sent back signal is executed.

Welcome Function Process at Disembarkation

The welcome process at Step S18 in FIG. 4 will now be explained in more detail referring to FIGS. 9 and 10. It is assumed that the driver stops the engine, disembarks, and departs with the entry key from the vehicle. As described previously, the disembarkation of the driver is followed by Step S12 (FIG. 4) for selecting the transmission of the BS response demand signal and resetting the variable n to 0 and Step S13 for enabling the transmission of the B response demand signal with timer interruption. Then, the welcome process is commenced at Step S18 in response to the reception of the correct B code.

The welcome process starts with Step S171 where it is examined whether the signal code received from the entry key is the A code or not. In the beginning, since the A response demand signal is not transmitted it is judged "NO", allowing the procedure to goes to Step S201. When it is judged at Step S201 that the received code coincides with the right B code, the procedure moves to Step S202 where the BREC flag representing the reception of the B code is set to 1 while the number of consecutive receptions of the A code denoted by I is set to zero.

At Step S203, it is examined whether the MU flag is 1 or not, which indicates that a manual code prior process having a priority to respond to the manual code received from the entry key 50 is being executed.

When it is judged positively at Step S203, the procedure moves to Step S213 where it is examined whether the T-MU timer for determining a duration of the manual code prior process is timed up or not. When the decision is positive, the procedure goes to Step S204 where the door is unlocked and Step S205 follows where the MU flag is shifted back to 0. If the decision is negative at Step S203 and the duration of the manual code prior process is not timed up, the procedure skips Steps S204 and S205 and jumps to Step S209. When Step S203 is negative, the procedure moves to Step S204 where the door is unlocked.

It is then examined at Step S209 whether the AREC flag is 1 or not. As the A code is not received by now, it is judged "NO". The procedure hence goes to Step S210 where the ATM flag is set to 1 for enabling the intermittent transmission of the A response demand signal. At Step S211, the variable n is set to 0. At Step S212, the timer interruption permitting bit for the I response demand signal is cleared off to inhibit the transmission of the I response demand signal. At Step S214, the BCHG flag is set to 0 for inhibiting the switching over from BS demand signal to BL demand signal. While the B code only is received continuously, the above steps are repeated.

When the A code is released from the entry key in response to the reception of the A response demand signal and received by the vehicle, it is judged "YES" at Step S171. The procedure then goes to Step S172 where the AREC flag is set to 1 while the OUT flag and the RCHK flag are turned to 0 to register that the entry key 50 is within the communication area for the A response demand signal and reset the T-OUT timer. At next Step S173, the variable I indicating the number of consecutive reception of the A code is increased by 1 for updating (I is thus turned to 1). It is then examined at Step S174 whether or not the variable I is turned to 2 (for example). In the beginning, I is not 2 and the procedure jumps to Step S180.

It is examined at Step S180 whether the BSTM flag indicating the selection of the BS response demand signal is 1 or not. As the BSTM flag is 1 so far, it is judged "YES" and the procedure moves to Step S181 where it is examined whether the BCHG flag for causing the B response demand signal being switched from BS to BL is 1 or not. As the BCHG flag is now 0, the procedure goes to Step S182 for setting the BCHG timer to, for example, 30 seconds.

The setting time for the BCHG timer may be determined on the basis of experiments or actual measurements to a duration enough to allow the entry key to get away enough from the vehicle and step out of the communication area for the BL response demand signal. Then, the procedure moves to Step S184 where the BCHG flag is shifted to 1. It is then examined at Step S185 whether the BCHG timer is turned to zero or not. In the beginning, the timer is not zero and the procedure returns back to Step S2.

When the A code is next received from the entry key, the procedure jumps from S174 to S180 and then from S181 to S185. As it is judged "NO" at Step S185 before the setting time (for example, 30 seconds) of the BCHG timer elapses, the procedure returns back to Step S2. When the setting time has elapsed, however, it is judged "YES" at Step S185.

As a result, the procedure advances to Step S186 where the BSTM flag for selecting the BS response demand signal is turned to 0. At Step S187, the BLTM flag for selecting the BL response demand signal is turned to 1. Accordingly, the transmission of the BL response demand signal is initiated by timer interruption. As the entry key is far enough away the vehicle and out of the communication area of the BL demand signal at the time, it is disabled to receive the BL response demand signal and sends back none of the B code.

As the entry key steps out from the communication area (FIG. 13) of the BL response demand signal, the B code is not received but the A code only can be continuously received by the vehicle side. With the welcome function, the decision only at Step S171 is continuously positive. This causes the variable I to be updated to 2 at Step S173 thus turning Step S174 to the positive decision. Then, it is examined at Step S175 whether the MU flag is 1 or not.

When the decision is positive, the procedure goes to Step S179 where it is examined, like the action of Step S213, whether or not the T-MU timer is timed up, i.e. the duration of the process for responding with priority to the manual code received from the entry key is elapsed. When the decision is positive, the procedure goes to Step S176 where the door is locked. Then, after the MU flag is turned to 0 at Step S177, the procedure goes to Step S180. If the decision at Step S175 is negative, the procedure also moves to Step S176 where the door is locked. When the judgment at Step S179 is negative, the procedure skips Steps S176 and S177 and jumps to Step S180.

As the entry key departs further from the vehicle, it is disabled to receive finally the A response demand signal and thus to release the A code. This causes Step S14 of the procedure to judge "NO" and the procedure moves via Step S15A shown in FIG. 4 to Step S30 shown in FIG. 5. Then, Block S41 follows in which the flags are examined at Steps S31 and S32 before the T-OUT timer is set to m seconds at Step S33, as described previously. As long as it is judged "NO" at Step S35, the procedure always restarts from Step S2.

Figure 5:
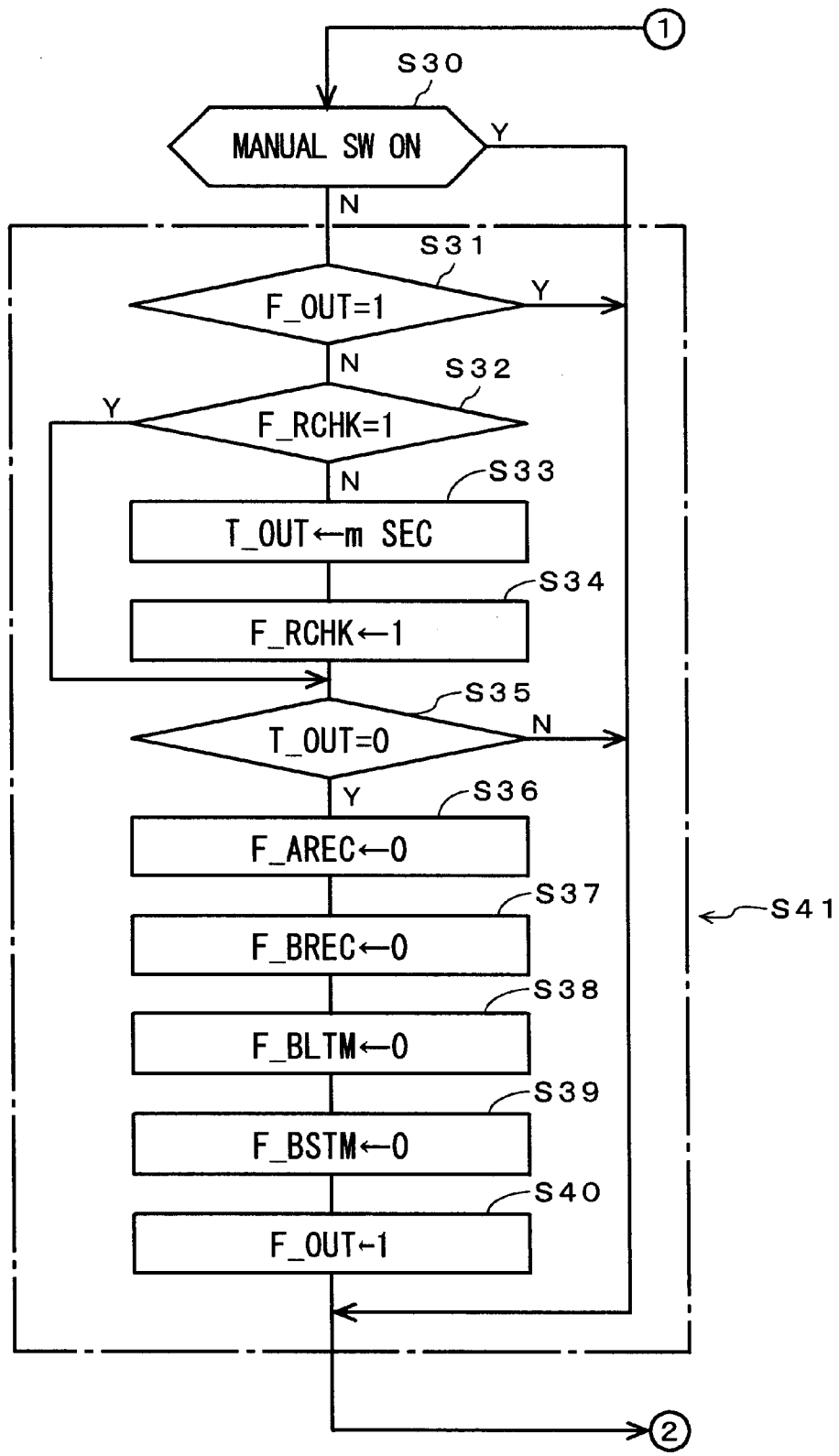
FIG. 5 is the remaining part of the main flowchart showing an action of the first embodiment of the present invention.

When the A code is no more sent back and it is thus judged "YES" at Step S35 after m seconds of the setting time on the T-OUT timer, i.e. any sent-back code from the entry key 50 is not received in a duration of m seconds, as illustrated in the flowchart of FIG. 5, the procedure moves to Steps S36 to S39 for initializing the AREC, BREC, BLTM, and BSTM flags to 0 which flags relate to the welcome process. The procedure then goes to Step S40 where the OUT flag is turned to 1 to register that the entry key 50 is out of the communication area for the A response demand signal. This is followed by the procedure returning back to Step S2 for repeating the steps.

As the BLTM and BSTM flags are set to 0 at the time, the procedure corresponds to the state after t8 in FIG. 3 and before t1 in FIG. 2 where the intermittent transmission of only the A response demand signal is executed. As apparent, the A response demand signal is not received by the entry key and its response signal carrying the A code is not sent back.

Welcome Function Process at Embarkation

A case of the driver with the entry key 50 approaching and embarking the vehicle will now be explained. As the entry keymoves from a far enough point where the A response demand signal cannot be received to a near point within the communication area for the A response demand signal, it receives the A response demand signal and sends back the A code in response. When a correct ID code is received by the vehicle, it is judged "YES" at Step S14 and the procedure goes to Step S15 for judgment whether the received code is the manual code or not.

When the judgment is affirmative, the procedure advances to Step S16 for executing the manual operation process which will be described in detail referring to FIG. 17. The received code is not assumed now to be the manual code and it is thus judged "NO" at Step S15. The procedure then moves to step S17 where it is examined whether the manual SW is turned on or not. When so, the procedure returns back to Step S2. But it is now judged "NO" and the procedure goes to Step S18 for initiating the welcome process shown in FIG. 9.

In the welcome process, "YES" at Step S171 and "NO" at Step S174 are provided and the procedure jumps to Step S180. As "NO" is also given at Step S180, it is examined at Step S188 whether the BLTM flag is 1 or not. At the time, the BLTM flag is not 1 and procedure moves to Step S189 where the BLTM flag is shifted to 1 to select the transmission of the BL response demand signal. Then at Step S190, the variable n is set to 1. While only the A code is received from the entry key, the above steps are repeated (excepting that because "YES" is given at Step S188, Steps S189 and S190 are skipped). The A response demand signal and the BL response demand signal are thus intermittently transmitted at their respective intervals of time.

Figure 9:
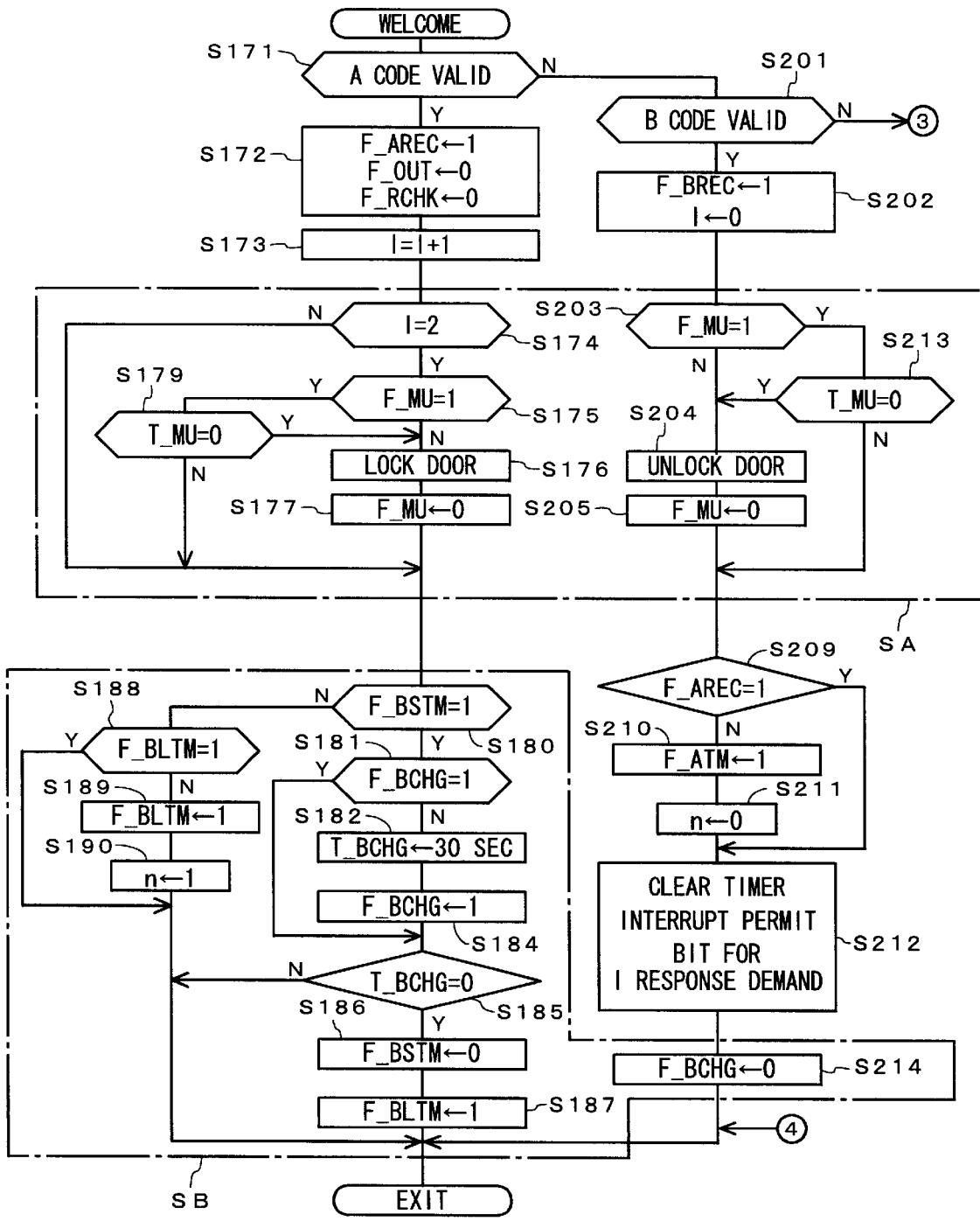
FIG. 9 is a flowchart showing a part of a welcome process in FIG. 4.
Figure 10:
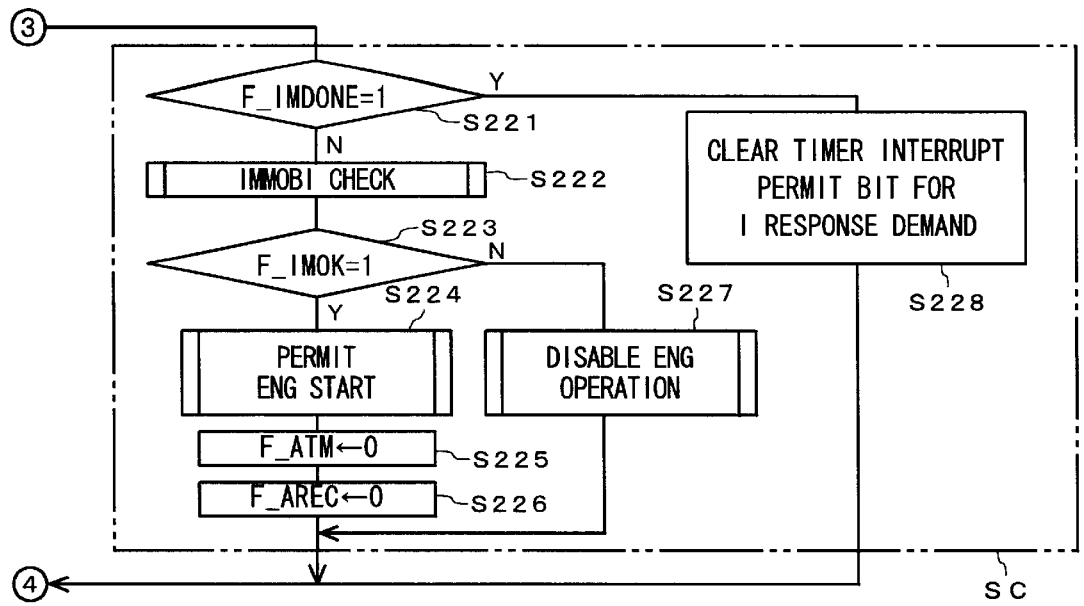
FIG. 10 is a flowchart showing the remaining part of the welcome process in FIG. 4.

The function of "carrying out the door lock control action responding to the manual control signal with a priority over the door lock control action in response to the reception of the response signal" as recited in claim 1 is implemented by a procedure from Step S203 to S213 and S209 and a procedure from Step S175 to S179 and S180 in the welcome function process shown in FIG. 9. More particularly, with said function, the door unlock action at Step S204 when the B code is received and the door lock action at Step S176 when the A code is continuously received in the welcome function routine are skipped according to the setting of the MU flag and the value of the T-MU timer determined in the manual control routine described later in detail. Accordingly, by temporarily inhibiting the door lock control action responding to the code in the response signal received, the door lock control action with the manual code can be maintained operative.

As the driver steps closer to the vehicle, the entry key is enabled to receive the BL response demand signal from the vehicle and send back the B code. When the B code is received by the vehicle, it is judged "NO" at Steps S171 and S203 but "YES" at Step S201. Accordingly, the door is unlocked at Step S204. As the A code has been received at that time, "YES" is given at Step S209 and the transmission of the I response demand signal is inhibited at Step S212. At next Step S214, the BCHG flag is shifted to 0 to inhibit the switching of the response demand signal from the BL to the BS, and the procedure goes to the exit.

Figure 4:
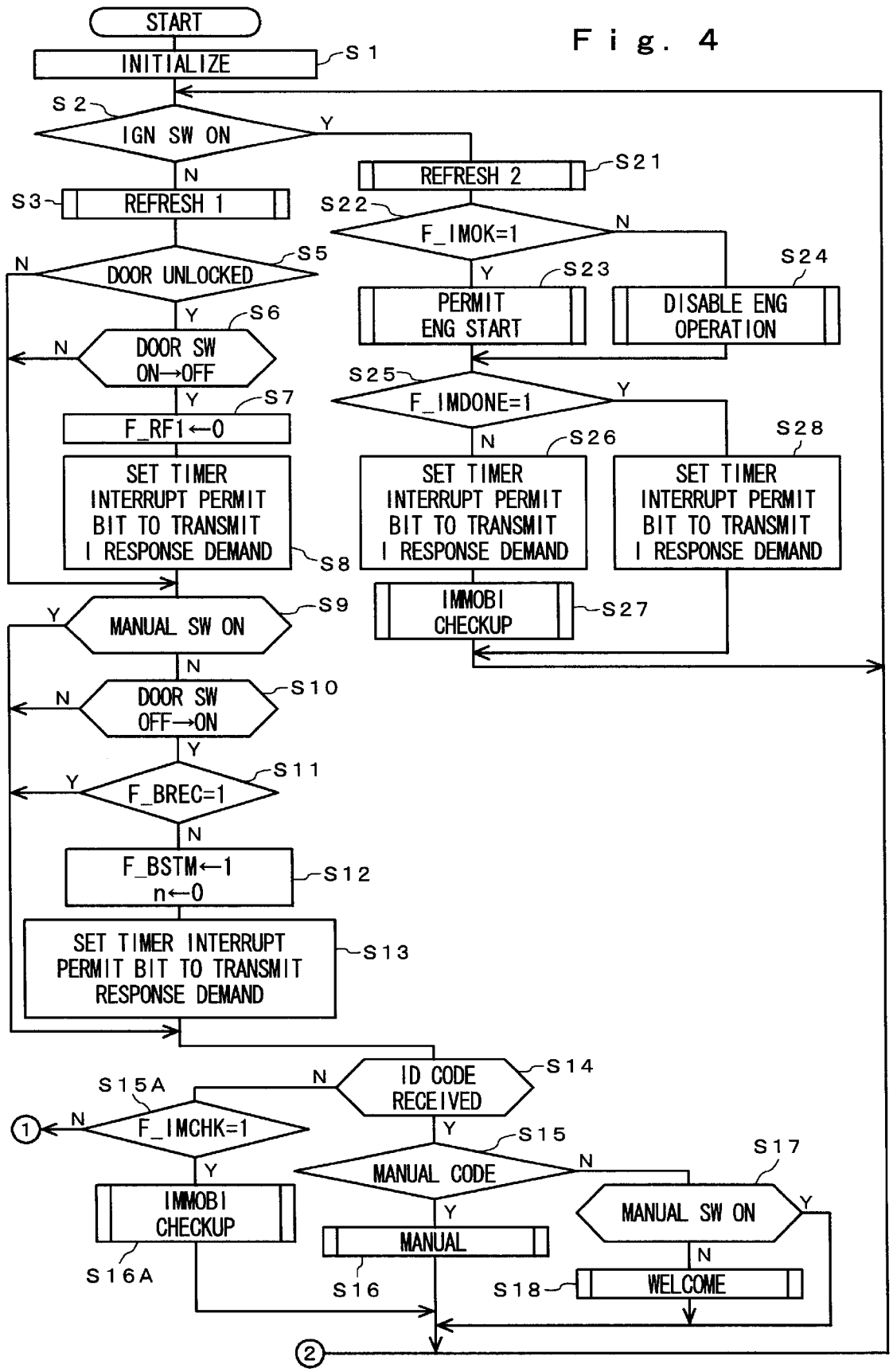
FIG. 4 is a part of the main flowchart showing an action of the first embodiment of the present invention.

As the driver opens the door, steps in the vehicle, and closes the door, it is judged "YES" at Step S6 (FIG. 4). Then, the timer interruption permitting bit for permitting the transmission of the I response demand signal is enabled at Step S8 to permit the timer interrupted intermittent transmission of the I response demand signal. At the time, the entry key is disabled to receive the A and B response demand signals (which are transmitted to only the outside of the vehicle) and hence, none of the A code and the B code are received by the vehicle.

The entry key 50 receives the I response demand signal and responds to send back the I code. When the I code is received by the vehicle, the procedure runs through Steps S14, S15, and S17 in FIG. 4 and enters, at Step S18, the welcome process shown in FIG. 9. As it is judged "NO" at both Steps S171 and 201, the procedure advances to Step S221 shown in FIG. 10. A block denoted by the chained line SC in FIG. 10 is a known immobilizing process.

It is examined at Step S221 whether the IMDONE flag indicating the completion of the immobilizing checkup is 1 or not. At the time, the immobilizing checkup is not executed and the procedure goes to Step S222 for executing the immobilizing checkup. In the immobilizing checkup, the I code received is examined whether it is valid or not as will be explained in detail later referring to FIG. 11. When so, the IMOK flag is turned to 1. Step S223 follows where the immobilizing checkup result is examined based on the IMOK flag whether or not it is all right.

When it is judged "NO" at Step S223, the operation of the engine is disabled at Step S227. When it is "YES", the procedure goes to Step S224 for permitting the start of the engine. At Step S225, the ATM flag is shifted to 0 and at Step S226, the AREC flag is shifted to 0. It may be possible at the time to reset the BLTM flag to 0 for stopping the transmission of the response demand signals. In the next cycle of receiving the I code, it is judged "YES" at Step S221. The procedure then moves to Step S228 where the timer interruption permitting bit for the I response demand signal is cleared off to prohibit the intermittent transmission of the I response demand signal.

The bit information of the IMOK flag is transferred via the communication line (bus) 32 to the FI-ECU 33 (See FIG. 1). In response to the bit of the IMOK flag, the FI-ECU 33 controls the operation of a fuel pump, a fuel injector, a fuel feeder, and an ignition device (each not shown) in any known manner so that when the bit is 1, the engine is enabled to be started and while when 0, the engine is disabled.

The blocks enclosed with the chain line SB in FIG. 9 are provided for assigning different levels of hysteresis to the communication area for the B response demand signals at the embarkation and the disembarkation, and selecting the BS response demand signal when the driver gets away from the vehicle for permitting the door locking at earlier timing and while the BL response demand signal when the driver approaches towards the vehicle for permitting the door unlocking at possibly earlier timing. It would hence be appreciated that when the hysteresis is not applied, the blocks for switching between the BS signal and the BL signal is unnecessary.

The steps enclosed with the chain line SA in FIG. 9 represent a procedure of stopping the execution of the process for responding with priority to the manual code after a predetermined time, which is a feature of the present invention.

Figure 8:
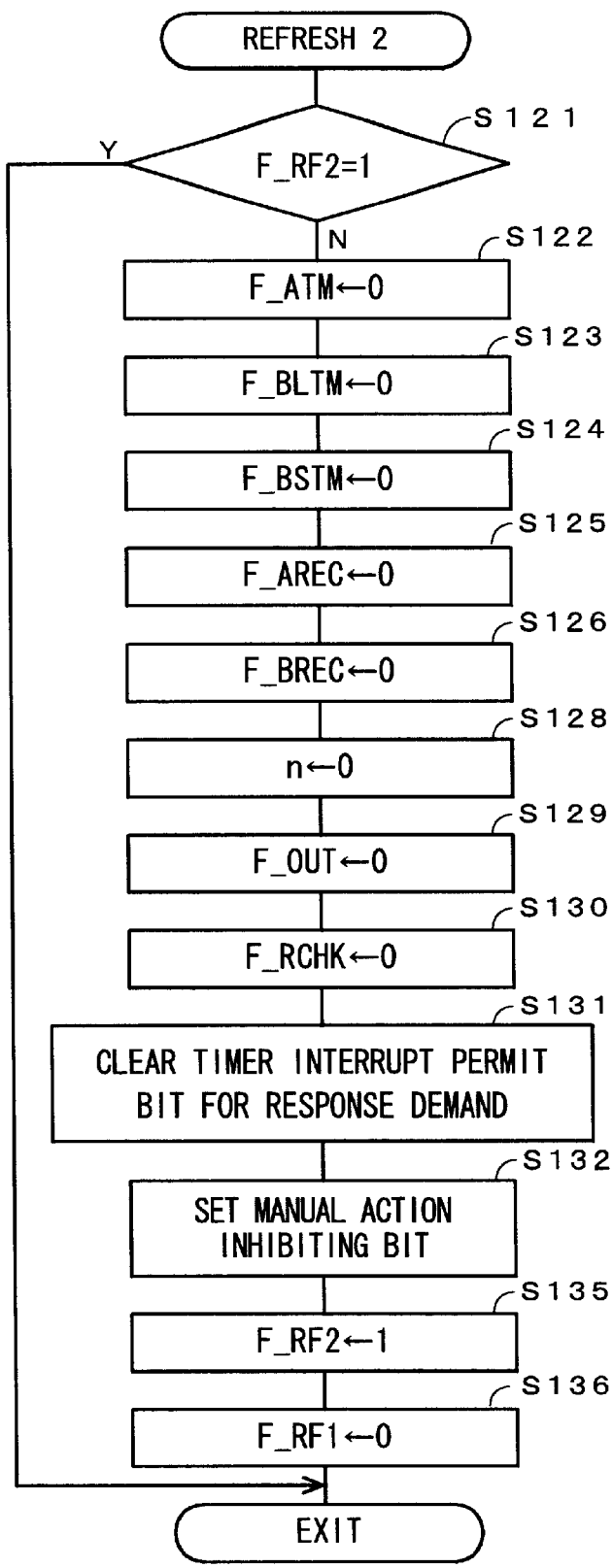
FIG. 8 is a flowchart showing a refresh 2 process in FIG. 4.

When the driver embarks and the IGN SW is turned on, it is judged "YES" at Step S2 in FIG. 4 and the procedure moves to Step S21 where a refresh 2 process for initializing the welcome function flags is executed as will be explained lately in more detail referring to FIG. 8. It is then examined at Step S22 whether the IMOK flag is 1 or not (i.e. the result of the immobilizing checkup is all right or not).

By now, the checkup is right and the procedure advances to Step S23 for enabling the start of the engine. It is then examined at Step S25 whether the IMDONE flag is 1 or not (i.e. the immobilizing checkup is finished or not). As the IMDONE flag is set to 1 in the immobilizing checkup process mentioned above, "YES" is given at Step S25. The procedure then goes to Step S28 where the timer interruption permitting bit for the I response demand signal is cleared off to prohibit the transmission of the I response demand signal. During the running of the vehicle, the IGN SW remains turned on, the above steps are repeated.

Figure 11:
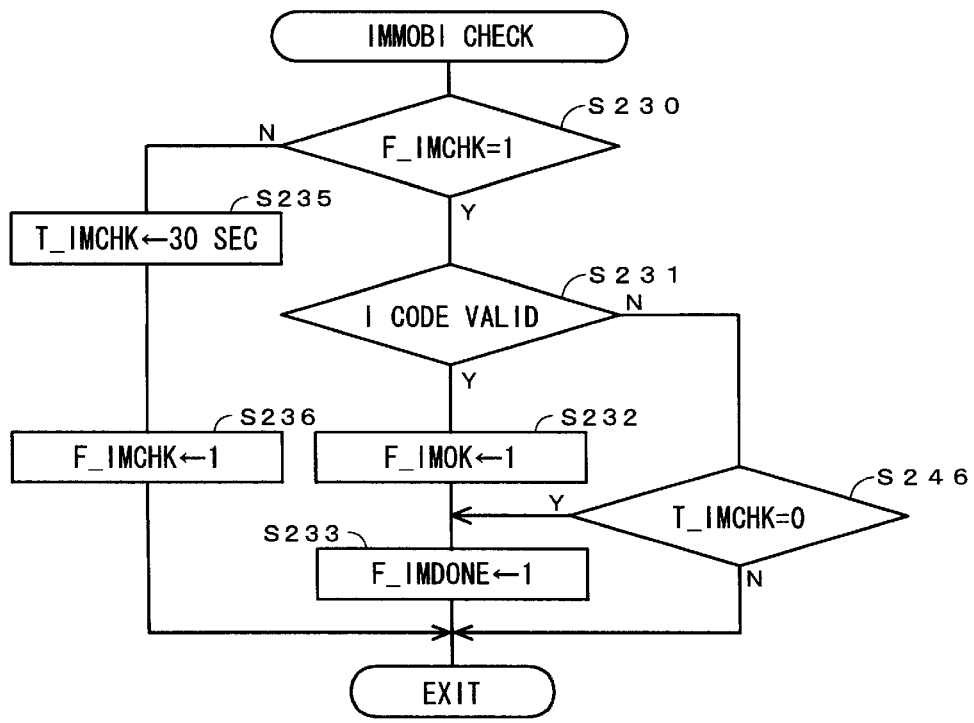
FIG. 11 is a flowchart showing an immobilizing checking process in FIG. 4.

When judged "NO" at Step S25, the procedure moves to Step S26 where the timer interruption permitting bit for permitting the transmission of the I response demand signal is set to 1 similar to at Step S8. Then, the immobilizing checkup process, which will be explained later in conjunction with FIG. 11, is executed at Step S27.

When the IGN SW is turned to the ACC or OFF position to stop the engine, it is judged "NO" at Step S2. The procedure then moves to Step S3 for executing the above described process at the disembarkation.

Figure 17:
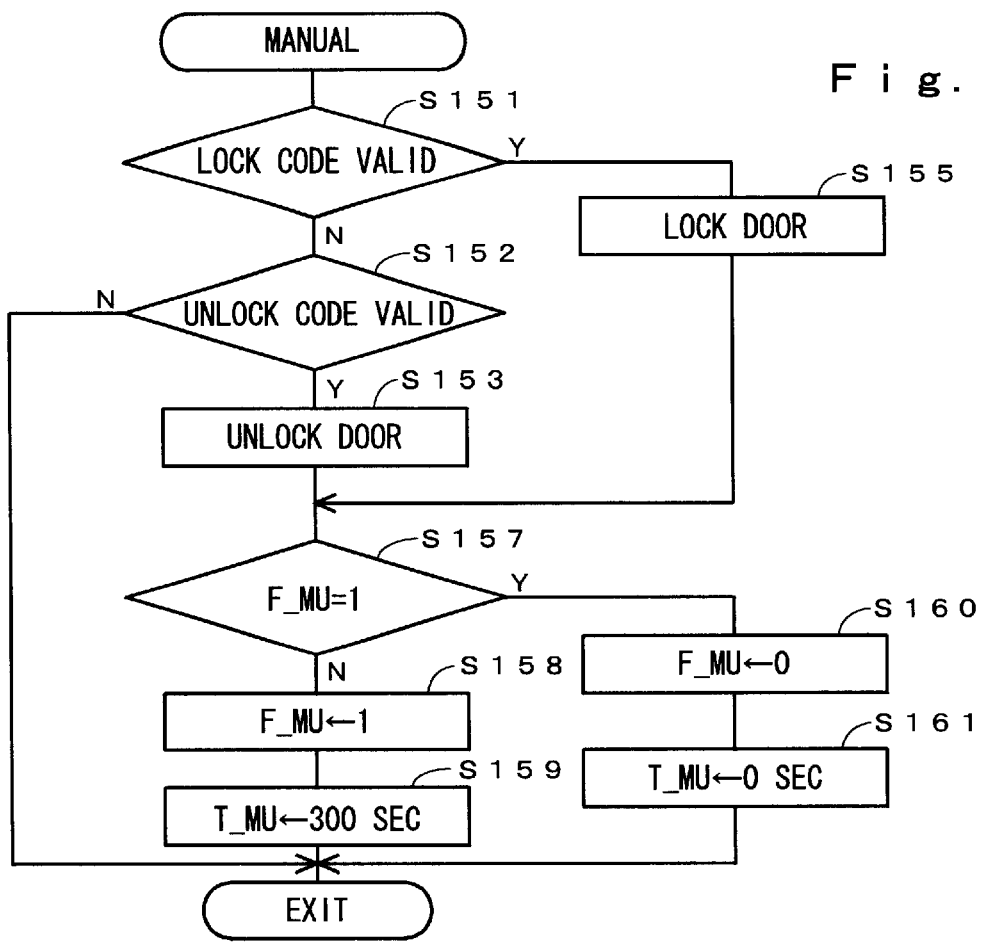
FIG. 17 is a flowchart showing a manual operation in an embodiment of the present invention.

The manual processing at Step S16 (FIG. 4) is now described in detail with referring to FIG. 17. It is a principal characteristic of the present invention. When manual code transmitted from the entry key 50 with the manual lock/unlock switches 56 and 57 operated is received by the vehicle, the decision at Steps S14 and S15 (FIG. 4) turns to positive and the manual processing at Step S16 is executed.

It is first examined at Step S151 in FIG. 17 whether or not the manual code received is a lock code released through manual operation of the manual lock switch 56 on the entry key 50. When it is negative, the procedure goes to Step S152 for examining whether or not the manual code is an unlock code released through manual operation of the manual unlock switch 57 on the entry key 50. When it is judged not, this routine is terminated and the procedure goes to the exit.

When Step S152 is positive, the procedure moves to Step S153 for unlocking the vehicle door(s). When the judgment at Step S151 is positive, the procedure goes to Step S155 for locking the vehicle door(s). It is then examined at Step S157 whether or not the MU flag is 1 (i.e. the process responding to the manual code is being carried out with priority). When it is not, the MU flag is turned to 1 at Step S158 to register that the prior manual code operation is being executed.

This is followed by Step S159 where the manual timer for monitoring the duration of the manual code prior operation is set to, for example, 300 seconds and the procedure is terminated to go to the exit. When Step S157 is positive, the procedure goes to Step S160 for resetting the MU flag to 0 and then Step S161 for resetting the MU timer to 0 seconds. Accordingly, when a new manual code (of either lock or unlock code) is received during the previous manual code prior operation, the previous priority process is instantly discontinued.

Figure 6:
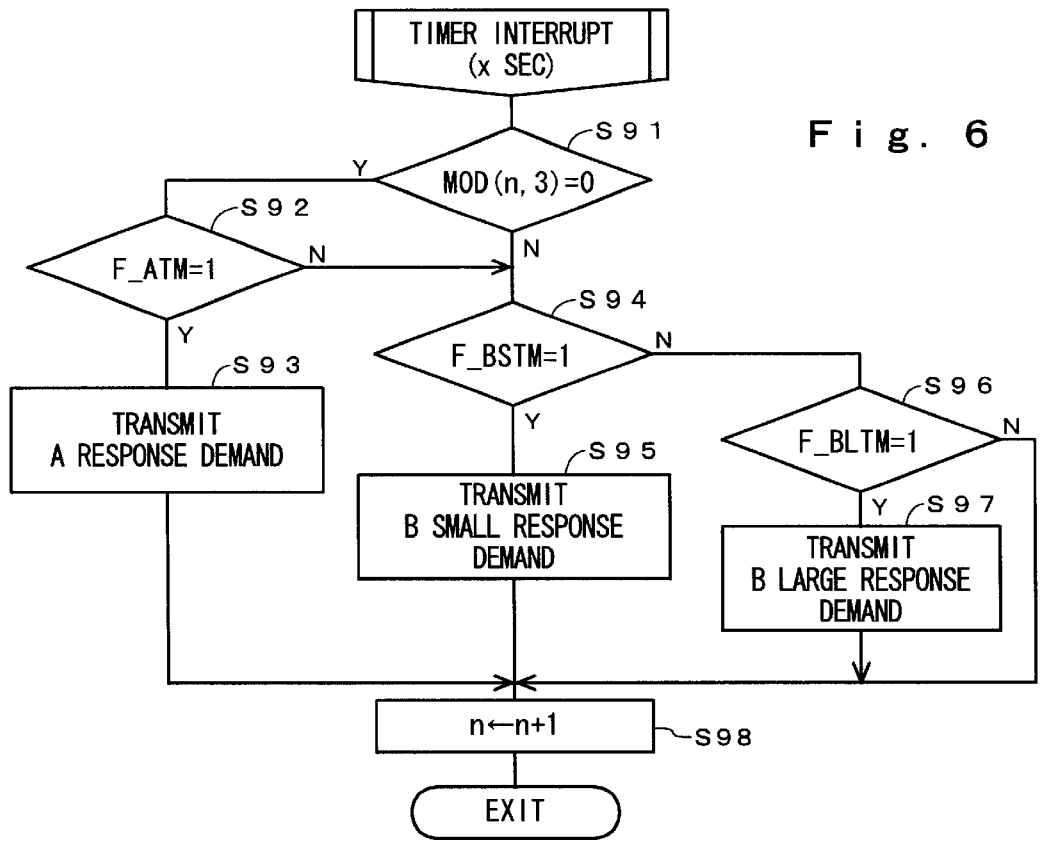
FIG. 6 is a flowchart showing the transmission of a response demand signal with timer interruption in the first embodiment of the present invention.

The transmission of the response demand signals in the welcome process will be explained referring to FIG. 6. This process is executed in every x seconds by the timer interruption to intermittently transmit the A or B (BL or BS) response demand signal, provided that the response demand signal transmission selecting flag is 1. The A, BL, and BS response demand signals may be selected as previously described referring to FIGS. 2, 3, and 13.

The procedure starts with Step S91 for examining whether MOD(n,3) is zero or not. MOD(n,3) is the remainder of the variable n divided by 3, which n is described previously concerning with Steps S190 and S211. When MOD(n,3) is zero, the procedure goes to Step S92 where it is examined whether the ATM flag is 1 or not. When so, the procedure goes to Step S93 for permitting the transmission of the A response demand signal.

When the remainder of n/3 is 1 or 2, it is judged "NO" at Steps S91 or S92 and the procedure moves to Step S94 where the BTSM flag is examined whether it is 1 or not. When so, the procedure goes to Step S95 for permitting the transmission of the BS response demand signal. When judged "NO" at Step S94, the procedure moves to Steps S96 for examining whether the BLTM flag is 1 or not. When judged "yes", the procedure advances to Step S97 for permitting the transmission of the BL response demand signal.

Figure 7:
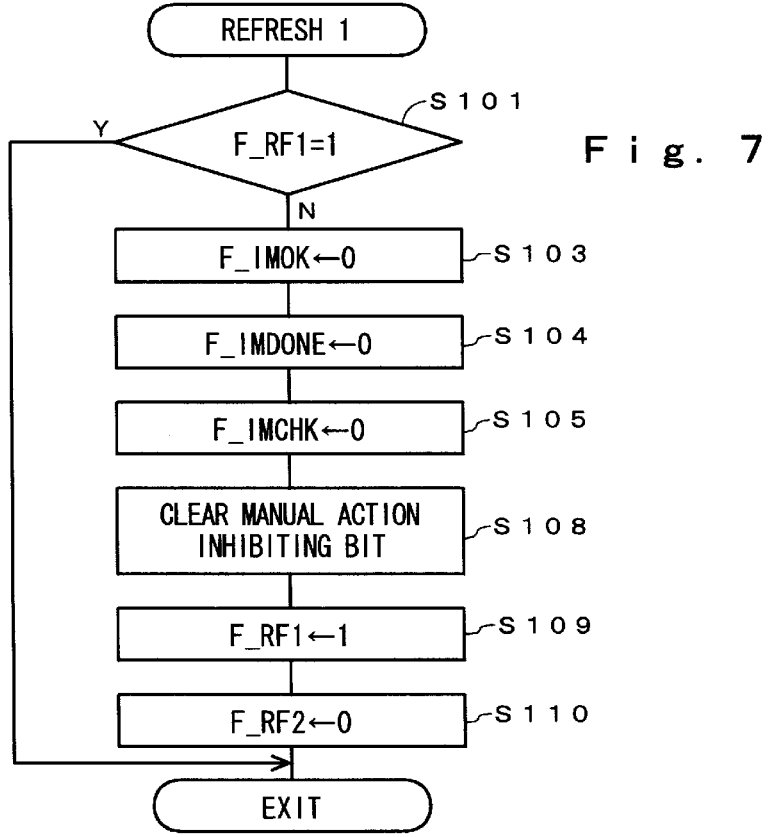
FIG. 7 is a flowchart showing a refresh 1 process in FIG. 4.

The refresh 1 process at Step S3 (FIG. 4) will now be explained referring to FIG. 7. At Step S101, the RF1 (refresh 1) flag is examined whether or not it is 1 as indicating that the refresh 1 process is completed. When judges "YES", i.e. the refresh 1 process is completed, the procedure jumps to EXIT. In the beginning, it is judged "NO". At next Step S103, the IMOK flag is shifted to 0 and at Step S104, the IMDONE flag (immobilizing checkup is done) is shifted to 0. At Step S105, the IMCHK flag (immobilizing checkup is started) is reset to 0. At Step S108, the manual operation inhibit bit is cleared.

As the result, the initialization of the immobilizing checkup flags is completed. At Step S109, the RF1 flag is turned to 1 to register that the refresh 1 process has been done. At Step S110, the RF2 flag is turned to 0 to register that the refresh 2 process is not yet done.

The refresh 2 process at Step S21 (FIG. 4) will be explained in more detail referring to FIG. 8. At Step S121, the RF2 flag is examined whether it is 1 or not, i.e. the refresh 2 process has been done or not. When "YES", the procedure jumps to EXIT. When judged "NO", the procedure runs through Steps S122, S123, and S124 for resetting the ATM, BLTM, and BSTM flags to 0, respectively. Those steps are to inhibit the transmission of the A, BL, and BS response demand signals, respectively.

This is followed by Steps S125 and S126 for resetting the AREC and BREC flags to 0, respectively. These two steps are provided for registering that the code A or B, which is included in a response signal send back from the entry key 50 in response to the reception of the demand signal transmitted from the vehicle, is not yet received by the receiver on the vehicle. At Step S128, the variable n for determining the response demand signal to be transmitted is turned to zero.

At Step S129, the OUT flag is shifted to 0 (denied) for indicating that the entry key 50 is out of the communication area of the A response demand signal. At Step S130, the RCHK flag is set to 0 to indicate that the T-OUT timer is not started which sets the limited time for detecting whether or not the entry key 50 is out of the communication area for the A response demand signal. At Step S131, the timer interruption permitting bit for the response demand signal is cleared off to inhibit the timer interrupted transmission. At Step S132, the manual operation inhibit bit is set.

After the above steps, the initialization of the welcome function flags are completed. Then, Step S135 follows where the RF2 flag is turned to 1 to register the completion of the refresh 2 process. At Step S136, the RF1 flag is reset to 0 for registering the non-completion of the refresh 1 process.

The immobilizing checkup process at Step S222 (FIG. 10) will be explained in more detail referring to FIG. 11. The immobilizing checkup process starts with Step S230 for examining whether the IMCHK flag for indicating the starting of the immobilizing checkup process is 1 or not. When the immobilizing checkup process is not started and "NO" is given, the procedure moves to Step S235 for setting the immobilizing checkup timer T-IMCHK to a desired immobilizing checkup period (for example, 30 seconds). At Step S236, the IMCHK flag is shifted to 1.

When the immobilizing checkup process has been started and it is judged "YES" at Step S230, the procedure advances to Step S231 for examining whether or not the immobilizing code I sent back from the entry key is identical to the code previously saved in a memory 5 or 13 on the vehicle. When so, the procedure goes to Step S232 where the IMOK flag is turned to 1 to indicate the confirmation of the immobilizing code comparison and Step S233 follows. Those steps allow the FI-ECU 33 to positively control the operation of the engine as described previously.

When judged "NO" at Step S231, the procedure goes to Step S246 for examining whether the IMCHK timer is timed up or not. When not, the immobilizing checkup process is terminated. When judged "YES" at Step S246, the procedure goes to Step S233. At Step S233, the IMDONE flag indicating that the immobilizing checkup process has been done is turned to 1.

Figure 12:
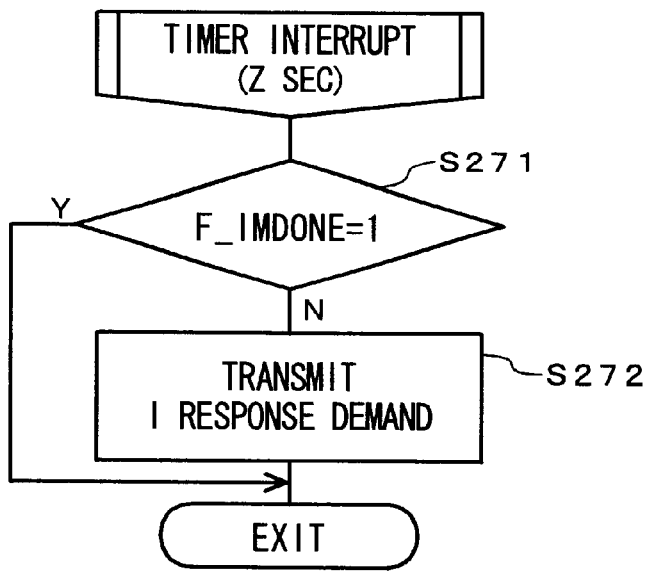
FIG. 12 is a flowchart showing the transmission of an I response demand signal with timer interruption in the first embodiment of the present invention.

FIG. 12 illustrates the intermittent transmission of the I response demand signal with the timer interruption permitting bit for the I response demand signal being enabled, where the timer interruption may be carried out in every z seconds. The procedure starts with Step S271 for examining based on the IMDONE flag whether the immobilizing checkup process is done or not. If not, the procedure goes to Step S272 for permitting the transmission of the I response demand signal. When the immobilizing checkup process has been done and it is judged "YES" at Step S271, the procedure is terminated to go to the exit.

According to the present embodiment, the control action of the vehicle door with the manual code contained in the manual control signal sent from the entry key can be performed with a priority even when the welcome function is enabled for carrying out the door lock control action in response to the reception of the response signal as an answer to the response demand signal.

For example, when the entry key has been departed by further than the predetermined distance from the vehicle whose door are automatically locked and a passenger not having the entry key wants to return back to the vehicle to fetch its articles, the user of the entry key can simply unlock the door by only operating its corresponding switch on the entry key at once, or upon finding the passenger coming close to the vehicle.

Also, the door can remain locked by way of precaution or be shifted from its automatically unlocked state to the emergent locked state when the automatic door locking is disabled with the entry key staying too close to the vehicle, or when the automatic door unlocking is implemented too earlier before the user arrives at the vehicle. Accordingly, while the welcome function for automatic locking and unlocking is utilized at optimum, the user of the entry key can be given with priority to any desired door lock control action at its option.

For implementing the advantages of the present invention at more certainty, it is desired to have the communication area (a signal receivable area) of the manual control signal released from the entry key set to a greater extension than that of the BL response demand signal released from the vehicle.

Moreover, the duration for the prior process responding to the manual code may be set to the timer, allowing the prior process to be automatically stopped when the duration is elapsed. Accordingly, even if the door(s) in automatically locked state determined by the welcome function is unlocked by using the manual control signal when the user is returning back to the vehicle, the door can automatically be locked again according to the welcome function after the setting duration and thus the user of the entry key will be free from minding the locking action.

In case that the door unlocked or locked by the welcome function is locked or unlocked by the manual switch on the entry key turned on accidentally, it can automatically be returned back to its original state determined by the welcome function when the setting duration is elapsed. Accordingly, as the manual operation of the switch on the entry key is unnecessary, the utility will more be improved.

In the previously mentioned embodiment, in addition to the BS and BL response demand signals for directly controlling the locking/unlocking of the vehicle door, the A response demand signal which covers a wider communication area than that of the BS and BL signals are transmitted from the vehicle. It should be, however, understood by those skilled in the art that the A response demand signal is not mandatory but may be omitted if desired.

The foregoing embodiment is based on the use of the B response demand signals common to all the doors of a vehicle in conjunction with their response signals. In that case, it may happen that when the entry key steps in such a predetermined communication area as denoted by the BL (large) in FIG. 13, all the doors are unlocked at same time.

Figure 14:
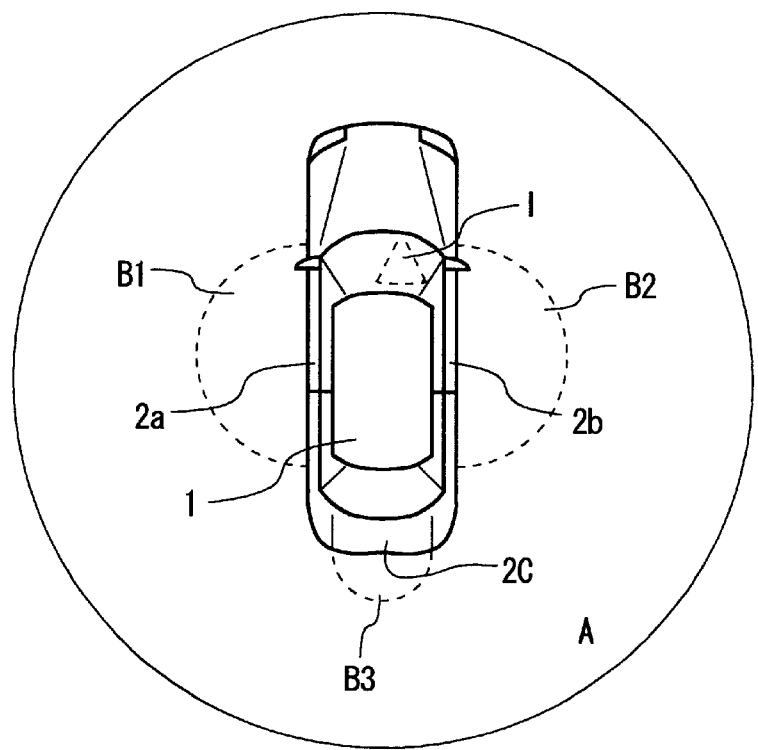
FIG. 14 is a schematic view showing the relation between the control operations and the distance from the vehicle to the entry key in another embodiment of the present invention.

For avoiding such a disadvantageous event, an alternative embodiment is provided as shown in the schematic view of FIG. 14 where three different B response demand signals B1, B2, and B3 which are uniquely assigned to and respectively have proper communication areas for two of left and right doors 2a, 2b and a rear trunk door 2c are provided. For example, when any one of the three B response demand signals is not received, all the doors are locked simultaneously. On the other hand, only a particular one of the doors can be unlocked by the controlling action of a vehicle mounted receiver which receives a B code for said particular door included in a response signal to the B response demand signal assigned to said particular door.

It is appreciated in case of FIG. 14 that the B response demand signals may be provided with such hysteresis characteristics between the unlock and lock operation as mentioned above, and/or the A respond demand signals with the widest communication areas may be omitted.

It should be also understood by those skilled in the art that for applying the B response demand signals assigned to their respective doors, Step S201 in the flowchart of the welcome process shown in FIG. 9 may be modified to examine the received code for its matching with an unique code assigned to each door. Hence, the modification of the flow chart will be explained in no more detail.

Figure 15:
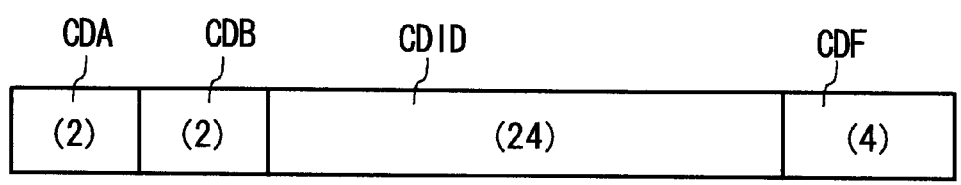
FIG. 15 is a diagram showing an exemplary bit format of the codes preferably applicable to the present invention.

FIG. 15 illustrates an exemplary format of the response signal applicable to the above- and under-mentioned embodiments of the present invention. The "code signal" used herein is a general term including the response signals sent back upon receiving the response demand signal and the manual codes released through operation of the manual switches on the entry key. In the figure, CDA is a start bit, CDB is an identification code, CDID is a unique ID code of the vehicle, and CDF is a function code while the number in each parenthesis represents an exemplary number of bits.

Basically, the ID code is used to judge whether the entry key is authentic or not and the function code is used to identify the A code (a search code), the B code (a door lock control basic code) and the manual code from each other. The function code may be comprised of four bits, respectively; for example, the A code is [1000], the B code [1001], the manual lock code [1101], and the manual unlock code [1100], respectively in the case of FIG. 13, while the A code is [1000], the B code for the driver's door [1001], the B code for the passenger's door [1010], the B code for the trunk door [1011], the manual lock code [1101], and the manual unlock code [1100], respectively in the case of FIG. 14.

Figure 16:
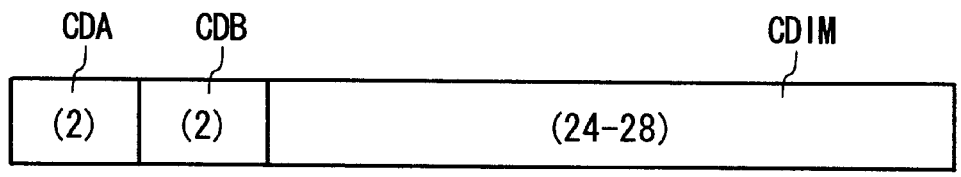
FIG. 16 is a diagram showing an exemplary bit format of the immobilizing code preferably applicable to the present invention.

FIG. 16 illustrates an exemplary format of the response signal for the (anti-thief) immobilizing function applicable to the embodiments of the present invention. As the code comparison for the immobilizing function is extremely important for ensuring the anti-thief action as well known, it may preferably be differentiated in the structure from the other codes. As shown, CDA is a start bit, CDB is an identification code, and CDIM is an immobilizing function ID code. It is also possible, however, to have all types of the response signals designed to a single particularly structured format, and to distinguish ID code on the basis of the function codes as other A and B codes.

Although the hysteresis characteristic is assigned to the communication areas for the B response demand signal between the unlock mode and the lock mode, the present invention is not limited to always have the hysteresis characteristics. The BL response demand signal and the BS response demand signal shown in the schematic view of FIG. 13 and the timing charts of FIGS. 2 and 3 may be a single and common B response demand signal.

As set forth above, according to the present invention, both locking and unlocking the vehicle door(s) are automatically controlled depending on the reception of the response signal at the receiver in the vehicle. But the present invention is not limited to such embodiments and any modification where either the locking or unlocking is automatically controlled may be made.

According to the present invention, the control action of the vehicle door with the manual control signal sent from the entry key can be performed with a priority over the door lock control according to the welcome function. For example, therefore, when the user of the entry key has been departed by further than the predetermined distance from the vehicle whose door are automatically locked and a passenger not having the entry key wants to return back to the vehicle to fetch its articles, the user of the entry key can simply unlock the door by only operating its corresponding manual switch on the entry key the suitable timing. Also, the door can remain locked by way of precaution or be shifted from its automatically unlocked state to the emergent locked state when the automatic door locking is disabled with the entry key staying too close to the vehicle or when the automatic door unlocking is implemented too earlier before the user arrives at the vehicle. Accordingly, while the welcome function for automatic locking and unlocking is utilized at optimum, the door lock control with priority desired by the user of the entry key can be compatible.

Moreover, when the duration for the prior process responding to the manual code is set on the timer, the prior process is automatically stopped after the duration is elapsed. The door can automatically be locked again by the welcome function after the setting duration and the user of the entry key will be free from paying attention to the door locking operation.

In case that the door unlocked or locked by the welcome function is locked or unlocked by the manual switch on the entry key turned on accidentally, it can automatically be returned back to its original state determined by the welcome function after the setting duration is elapsed. Accordingly, the manual operation of the switch on the entry key is unnecessary to restore the original state, thus the utility will more be improved.

What is claimed is:

1. A remote control system for a vehicle door comprising:
   a transmitter mounted on the vehicle for transmitting a response demand signal receivable within a predetermined range outside of the vehicle;
   a portable transmitter/receiver for transmitting a response signal in response to receiving the response demand signal, and being provided with a manual switch for transmitting a manual control signal which is distinguishable from the response signal;
   a receiver mounted on the vehicle for receiving the response signal and the manual control signal transmitted from the portable transmitter/receiver; and
   a controlling means on the vehicle for determining whether or not the response signal and the manual control signal received at said receiver are valid, and for controlling at least one of locking and unlocking of the door(s) of the vehicle in response to the valid signal received, and the controlling means being provided with a timer to start measuring a predetermined time in response to reception of the valid manual control signal, and during the predetermined time, the controlling means carries out the door lock control action corresponding to the valid manual control signal with priority, while inhibits the door lock control action corresponding to the valid response signal received.

2. A remote control system for a vehicle door according to claim 1, wherein the prior door lock control action corresponding to the manual control signal is stopped when another manual control signal is received by said receiver within the duration of the prior door lock control action.

3. A remote control system for a vehicle door according to claim 1, wherein the transmission of the manual control signal from the portable transmitter/receiver has priority over the transmission of the response signal.

* * * * *